Patented Sept. 29, 1936

2,055,706

UNITED STATES PATENT OFFICE 2,055,706

METHOD OF MAKING CERAMIC PRODUCTS

Charles F. Ramseyer, Chicago, Ill., assignor to Chicago District Electric Generating Corporation, Hammond, Ind., a corporation of Indiana No Drawing. Application June 6, 1932, Serial No. 615,757

2 Claims. (Cl. 106—11)

This invention relates to an improved method of making fired ceramic bodies by the addition thereto in the unfired state of fly ash resulting from the combustion of pulverized fuel, and the improved product resulting from the use of such method.

Among the objects of the present invention may be mentioned the reduction of the drying time and/or drying shrinkage and/or burning shrinkage of ceramic products, all or any of such results tending to speed up the production thereof and/or improve the resultant product. Another object of the invention is the opening up of a new market and use for a hitherto largely wasted and unused by-product from the firing of pulverized fuel, commonly known as "fly ash". A further object is the increased utilization of low grade clays, hitherto usable only for the lowest grade products, for the production of more valuable types of products.

This "fly ash", as I shall call it henceforth, and the method of formation of which I shall more fully describe hereafter, consists of extremely minute, fused, spherical, glassy particles which have passed through so high a temperature (2500-4000° F.) that all their firing shrinkage has been eliminated. Due to the smooth, glassy, non-absorptive character of its individual particles it requires much less water to wet it than do other known and commonly used ceramic materials. In addition, due to the round, spherical shape and smooth, glassy, non-absorbent surface of the fly ash particles, a much larger proportion of this pre-shrunk, non-plastic material may be used in ceramic mixes than of the other commonly used non-plastic or low-plastic materials, such as, for example, potters' flint, flint clay, silica, or grog (ground burnt clay).

By thus cutting down on the percentage of plastic materials required, the amount of water needed to make a workable ceramic mix is reduced, which naturally also helps to reduce the drying time and shrinkage commonly experienced in the processing of such products, as well as tending to increase their density and strength.

I recognize the fact that ashes of one kind or another have been used since time immemorial in the production of various types of ceramic products, but such ashes have always been either of a porous, absorbent nature, or if fused or hard, as "clinkers", required special grinding before they could be used, and moreover, even after grinding, the individual particles were not spherical in shape, but irregular and jagged, as one would naturally expect in a material produced by grinding. My material is of comparatively recent origin, and has been produced in commercial quantities only since large steam power generating stations fired with pulverized coal have been placed in operation and specially equipped with means of removing the finely divided ash from the waste flue gases. This ash is a new material, with special physical properties never before known in any previous ashy product and is specially suited, because of its physical characteristics, for use as an ingredient of ceramic mixtures.

This material which I propose to use as the new and useful ingredient in ceramic mixes for my purpose and which is currently known as fly ash, is commonly produced as a by-product from the combustion of pulverized coal, although any solid or liquid combustible matter (purposely or otherwise contaminated with incombustible matter) burnt in a finely divided state at a temperature high enough to fuse its incombustible portion, would furnish, if the fused, finely divided, incombustible matter were recovered from the flue gases, a material suitable for my purpose.

This fly ash from the combustion of pulverized coal (which is the material with which I have worked, although I do not limit myself to this, as any fine material consisting of small, fused, glassy, globular particles substantially insoluble in water and from 100 microns in diameter down, in size, will give similar results) consists of that portion of the ash of the original powdered coal which has been completely fused into small particles too light to fall to the bottom of the furnace and so is carried along by the flue gases until separated therefrom by special means used for this purpose. The fact that the original pulverized coal, before being burned, is ordinarily ground and pulverized to such an extent that 60% to 70% passes through a 200 mesh sieve, and that the ash is only 10% to 12% of the whole by weight or 3% to 4% by volume, explains the fineness of the material. Any particles that stick together or are otherwise too heavy, fall down to the bottom of the furnace and do not become a part of the fly ash, which consists solely of that part of the fly ash or flue dust which is floated away by the combustion gases.

I believe the mechanism of formation of fly ash, which perhaps will help explain some of its physical and chemical characteristics as well as its usefulness in ceramic mixtures, to be somewhat as follows:

The coal dust being blown into a hot furnace with sufficient air to burn it, loses almost instantly its combustible portion and each remaining tiny porous particle of ash, from which the carbon has burnt away, is raised almost instantly many degrees above its melting point. The surface tension of the liquid coalesces it into a single minute spherical drop which is then carried off and cooled so rapidly that it freezes into a smooth, shiny, transparent to translucent drop of glass before any of the normal crystalline elements which its chemical composition calls for have a chance to form.

This fly ash, as recovered from the furnace flue gases at the plant with which I am familiar, will average from 90-97% through a 325 mesh sieve. Practically all the particles present are small, glassy globules of a wide range of particle sizes, this range being one factor in its successful use in the making of denser and stronger products from ceramic mixes in which it is used. Since each particle is a fused solid mass, no additional shrinkage can take place in its during any subsequent firing; being glassy it absorbs little water; being spherical and non-absorbent it reduces the plasticity of plastic mixtures less than any other known material of equivalent fineness. Although a non-plastic material in the ordinary ceramic sense of the word, the spherical shape of its particles offers a minimum of resistance to the plastic flow of any mass in which it may be incorporated.

In chemical composition I do not restrict myself in any way, except that the material shall be substantially insoluble in water. The fly ash with which I am familiar contains from 1½% to 3% or so of water soluble material, largely in the form of calcium sulfate ($CaSO_4$). A typical chemical analysis of fly ash from the combustion of coals mined in the mid-western coal fields of the United States runs:

|  | Per cent |
|---|---|
| FeO } (iron oxides) { | 3.7 |
| $Fe_2O_3$ | 17.8 |
| $SiO_2$ (silica) | 46.4 |
| $Al_2O_3$ (alumina) | 20.6 |
| CaO (lime) | 6.4 |
| MgO (magnesia) | .7 |
| $TiO_2$ (titania) | .8 |
| $SO_3$ (sulphur trioxide) | 1.5 |
| Alkalies—less than | 1.0 |
| Free carbon | 1-2.0 |

The quantity of fly ash employed in manufacturing a ceramic product will depend, to a large extent, upon the bonding strength of the ceramic material employed, and the particular manner in which the product is to be formed. For example, if extrusion of a wet column of the ceramic mix is the method utilized, with clays of low bonding power considerably less fly ash can be employed than with clays having a higher bonding power. Therefore, as a practical matter, it is obvious that the particular proportion of fly ash and clay must be determined in accordance with the bonding strength of the clay, and the method employed in forming the ceramic product, such as whether stiff mud, soft or plastic mud molding, slip casting or dry pressing is employed.

Except for the free carbon, and the $SO_3$ which is present (as $CaSO_4$ or gypsum) each individual glassy particle consists of the various oxides all completely fused together, the proportions varying somewhat from particle to particle but with no definite relation to particle size.

The chemical composition of a suitable material for my purpose could, of course, vary widely and still have the particles consist of smooth, glassy, fused spheres or globules. The melting point and melting characteristics of such materials would depend more or less on their chemical composition, and the melting point would also, of course, be significant for its use in any actual ceramic mixture, but the main points required for my purpose are that the powdered substance shall consist of smooth, glassy, fused globules, a major proportion of which are less than 100 microns in diameter.

It is not possible to state just what proportion of fly ash should be used in ceramic products to get the best results, due to the wide variety of raw materials and products used and made in the ceramic industry, the greatly varying plasticity of different clays, and the wide range of properties desired in the finished product. With a buff burning clay 50% of fly ash gives a very satisfactory terra-cotta body of a pleasing light brown color. With an extremely plastic material such as bentonite, or in a dry press product, as much as 90% fly ash may be used, whereas in another mixture that has already practically reached its lower limit of plasticity, as little as 5% or 10% of fly ash may be added to help the drying characteristics of the mixture or to change the color slightly. Any ceramic producer knows that the most advantageous proportion in which to use a ceramic material differs with every clay and must be determined by preliminary trial.

Due to its brownish coloring when re-fired, the fly ash from mid-western coals cannot be used to produce white bodies, although as mentioned above, a material having the properties of fly ash for ceramic purposes could be produced that would give a white color when re-fired. Fly ash, as such, is usable in the medium and lower grade classes of ceramic products, among which may be mentioned all types of earthenware, stoneware, sanitary ware (subsequently glazed), drain and sewer pipe, terra-cotta and common building, face and paving bricks.

It is well known that sulfur and carbon in clay are detrimental to clay products if present in amounts greater than 1% or so each, and at times the amount of carbon and/or sulfur in fly ash may run above these amounts, but this is not normally the case. If it is desired to lower the sulfur in the fly ash for any reason this may be done by washing it with water in any suitable combination of washing tanks, settling tanks, thickeners, filters, or other suitable means, since the sulfur is largely present in the form of water soluble calcium sulfate ($CaSO_4$). Indeed, this salt forms practically the entire water soluble portion of the fly ash from mid-western coals.

If it should be for any reason desirable to lower the carbon content of the fly ash, this may be done by oxidizing the carbon to carbon dioxide by any suitable means, the simplest probably being to heat it in the presence of free oxygen, as in air, to the ignition temperature of the carbon present, when the carbon will burn out. Ordinarily for the commoner commercial ceramic products which are produced in large quantity, such as bricks, treatment of the dust previous to use will not be necessary. I have found free carbon varies in various fly ashes according to the combustion conditions, from less than 1% to more than 10%. The reason as much as 10% is left in some samples from some plants is due to lack of excess air or oxygen necesary to burn it completely in the short time that it takes for the flame to pass through the boiler. When the resulting dust or flue gases, however, is heated in the presence of air containing 21% oxygen instead of the 3 to 4% present in the flue gases, no trouble is experienced in oxidizing the carbon so that less than 1% remains. I do not claim that any particles of carbon which are completely encased inside a fused particle of the ash will be affected by this treatment, but the amount of such carbon is relatively small. It is therefore possible, by reheating the dust particles or fly ash in the presence of air or oxygen, to completely oxidize the free carbon associated with such particles, and thus to remove any carbon which might produce undesirable characteristics when used in a ceramic composition.

This reheating may be carried on in various ways, for example, by feeding the dust or fly ash through a double-shelled kiln, the dust being in the central or concentric portion and being heated by conduction through the walls of the kiln, hot atmospheric air being drawn over the dust as it proceeds counter-currently through the kiln. Such kilns are known in the various industries, finding use, for example, in the calcination of salts and similar processes. Or, if desired, the hot dust might be dropped through an electrically heated tube in counter-current contact with air, the dust with the lower carbon content being collected at the bottom of the tube.

The fusion and softening points of the fly ash will vary greatly, depending on the fuel from which it is produced. That derived from midwest coals which I have investigated will soften and melt from 2100 to 2400° F. If used with a refactory clay that normally vitrifies at a high temperature, the fly ash will enable a lower firing temperature to be used. On the other hand, if used in large proportion with a low grade clay of a low melting point, say around 2000° F., the fly ash will tend to stiffen it at burning temperatures and aid in the production of more uniform bricks showing less warpage and shrinkage. The proper proportions and burning temperature of such mixtures can only be found by trial.

A simple test showing how the addition of fly ash cuts down shrinkage and warpage can be made by taking 50% of clay and 50% of fly ash and molding the mixture with a little water into a small ball an inch or two in diameter and then placing it immediately in a furnace at 1800° F. After it has come up to furnace temperature it may be taken out and upon cooling will ordinarily show no cracks or bloating of any kind from this severe treatment.

That my invention is not without importance for the pulverized fuel burning industry can be shown by the fact that some users of large boiler furnaces have recently refrained from installing pulverized fuel equipment, to a large extent because of the difficulty and expense of disposing of the resultant fly ash, which usually runs from 50% to 80% of the total ash in the coal burnt.

Some of the results accomplished by the use of my invention may be summarized as follows: The development of a market for a hitherto largely waste by-product of the combustion of pulverized coal; an increase in the usefulness of some types of low grade clays for the more economical production of products superior to those ordinarily made; an increase in the speed and efficiency of the drying and firing operations in the manufacture of ceramic products; the production of a superior product at a lower price than is possible by present methods.

The advantages of my invention are that by the use of a finely divided, fused, non-plastic material of which the major proportion of the individual particles are glassy and spherical in shape and below 100 microns in diameter, I am enabled to produce workable ceramic mixtures containing a smaller amount of plastic material than is usual, by which the drying time and/or drying shrinkage and/or burning shrinkage of the products made therefrom are reduced, resulting in more economical production and/or a superior product as compared to that obtainable without the use of my material.

What I consider new and desire to secure by Letters Patent is:

1. A method of producing a ceramic product capable of resisting shrinkage and cracking when subjected to immediate high temperature firing which comprises collecting the coal-ash-dust particles suspended in the gases derived from the combustion of pulverulent coal, treating said particles to remove sulphur and any carbon present in excess of 2 percent in said fly ash therefrom, and admixing said particles with a binder comprising from 4 to 5 per cent of bentonite clay.

2. A method of treating coal-ash-dust particles employed as a substitute for the non-plastic materials used in making ceramic mixes to enable said mixes to resist shrinkage and cracking when subjected to immediate high temperature firing, which comprises burning pulverulent coal in the presence of oxygen, collecting the suspended coal-ash-dust particles carried in the gaseous products of said combustion, treating said particles to remove water-soluble materials therefrom, refiring said particles to remove carbon therefrom, and subsequently admixing said refired particles into said ceramic mixes.

CHARLES F. RAMSEYER.